Jan. 29, 1957  R. B. OLNEY ET AL  2,779,577
SPRAY GRID TRAY GAS-LIQUID CONTACTING
Filed Dec. 12, 1950  3 Sheets-Sheet 1

Inventors: Richard B. Olney
Carl P. Strand
By: *Oswald H. Wilmore*
Their Attorney Inventors: Richard B. Olney
Carl P. Strand By *Oswald H. Wilmore*

Their Attorney

Jan. 29, 1957 R. B. OLNEY ET AL 2,779,577
SPRAY GRID TRAY GAS-LIQUID CONTACTING
Filed Dec. 12, 1950 3 Sheets-Sheet 3
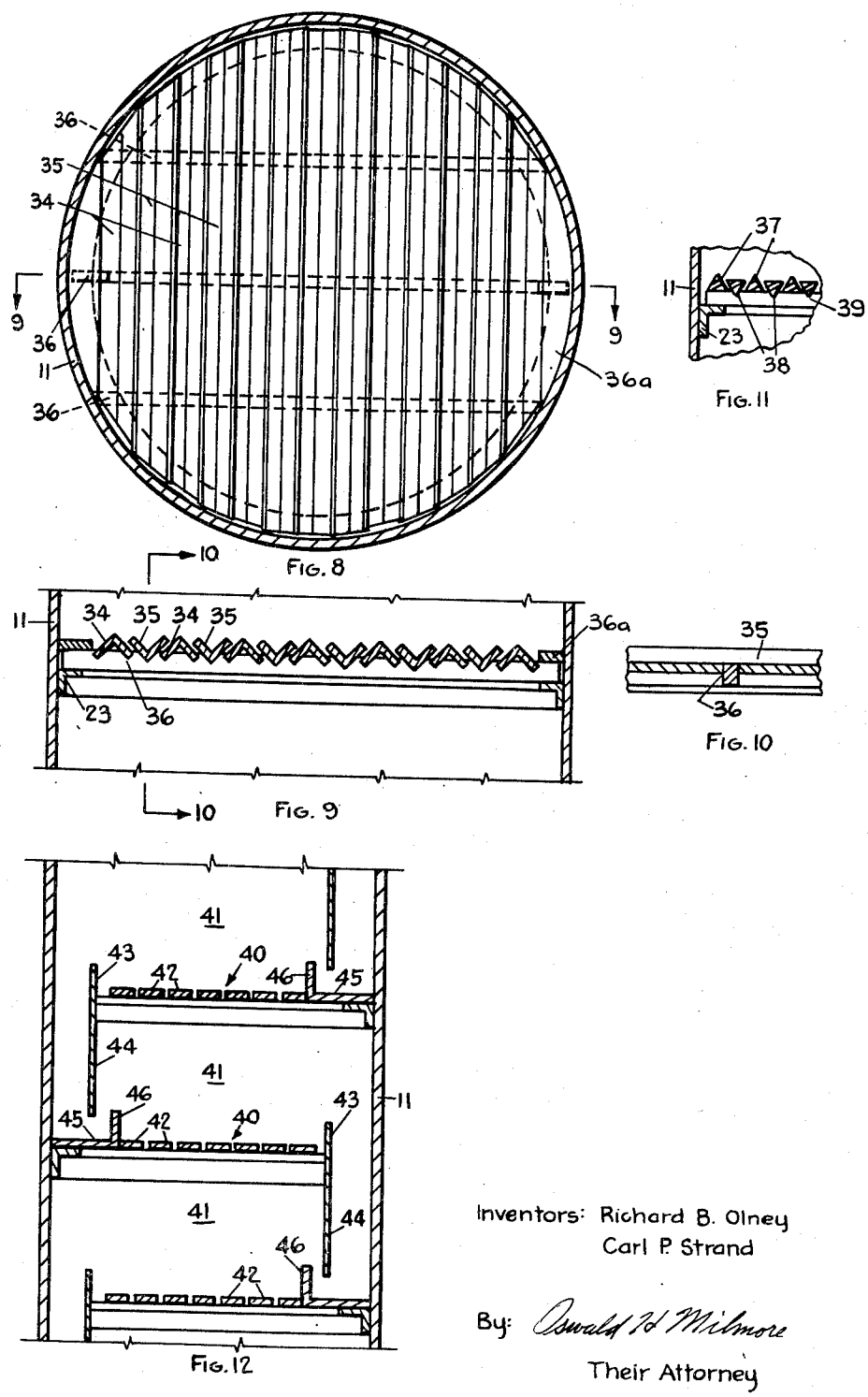
Inventors: Richard B. Olney
Carl P. Strand
By: Oswald H. Milmore
Their Attorney

United States Patent Office 2,779,577
Patented Jan. 29, 1957

2,779,577

SPRAY GRID TRAY GAS-LIQUID CONTACTING

Richard B. Olney, Oakland, and Carl P. Strand, El Cerrito, Calif., assignors to Shell Development Company, Emeryville, Calif., a corporation of Delaware Application December 12, 1950, Serial No. 200,431

5 Claims. (Cl. 261—113)

This invention relates to the art of contacting liquids with gases and resides in an improved method and apparatus for flowing a gas countercurrently to a liquid through an upright column to effect intimate contact between the gas and liquid, for example, to effect a mass transfer or exchange of components as is done, for example, in fractional distillation columns, gas washers, and other contacting devices or to effect a chemical reaction between the gas and liquid, such as progressive oxidation of a liquid with an oxidizing gas. More particularly, the invention relates to apparatus and method using columns containing superposed spray grid trays that are spaced vertically to provide intervening spray zones or spaces of appreciable heights (such spaces being either empty or provided near the top with entrainment-preventing devices, e. g., screens, baffles, etc.) wherein the liquid flows downwards from tray to tray and the gas flows upwards through the slots between the grid bars at a velocity sufficient to effect a build-up of liquid on each tray and to spray the liquid upwards into the supervening spray space.

Methods and apparatus of the type described in the foregoing paragraph, which operate within a definite operating range between a dispersion point and a load point, are, for brevity, herein referred to as spray grid tray contacting methods and spray grid tray columns, respectively, to distinguish them from methods and apparatus employing drip laths or drip rails, such as are commonly used in cooling and gas washing towers, wherein no upward spray is formed and wherein there is, consequently, no atomization of the liquid. Such drip laths or rails are sometimes arranged as grate-like trays without vertical intervals or with relatively close vertical spacings that do not form spray zones of sufficient heights for the upward passage of atomized liquid and the effective contacting between such atomized liquid and the gas between trays, and/or the gas does not flow through the slots at a sufficient velocity to build up a body of liquid on the tray and to disrupt such body to throw a dense spray up above the bars. Instead, contact in such devices is effected by passage of gas over the extended film of liquid that descends along the sides of the laths or rails or the current of liquid dripping therefrom or by subdivision of the liquid by spattering when it drops onto successive laths or rails. Such devices are operated below the "dispersion point" as defined in this specification.

It has been found that spray grid tray columns, apart from their greater simplicity and economy, are highly effective for bringing about intimate contact between gases and liquids and possess certain advantages over columns equipped with the usual bubble cap trays, which include lower mechanical friction loss due to fluid flow and, hence, lower pressure drop through the column, higher capacity for handling gas and liquid and lower liquid holdup within the column, whereby the sojourn-time of the liquid is reduced and undesired side-reactions and decomposition of liquid are reduced. While the contacting efficiencies of individual spray grid trays are sometimes lower than those of well-designed bubble cap trays, investigations have shown that spray grid trays can be mounted closer together than bubble cap trays, and that the spray grid tray efficiencies result in a net gain in contacting power per vertical foot of column. Stated in other words, it is possible to realize more theoretical fractionating or contacting stages per linear foot of column with spray grid trays than with bubble cap trays. A further advantage is that, since the capacities of spray grid tray towers are higher than those of bubble cap towers, the peak efficiency in spray grid tray columns occurs at a higher loading than in the case of bubble cap columns; moreover, under some conditions the efficiency in spray grid tray columns is not as sensitive to the vapor load as it is in bubble cap columns.

According to the invention it was found that the characteristics of grid trays are greatly affected by the shapes of the slots, such shapes being determined by the shapes of the bars, and that various shapes are superior to others with regard to certain characteristics. Among such characteristics are the contacting efficiency of a tray and the operating range.

It is an object of this invention to provide a spray grid tray contacting method and column having improved contacting efficiencies. A further object is to provide a method and fractionating column using spray grid trays having an enlarged operating range. Still further objects are to provide a spray grid tray that may be used as a replacement for existing bubble cap trays in fractional distillation columns, reactors, and the like to increase the efficiency, capacity or operating range and/or to decrease the pressure drop through the column, or may be used in new installations; to provide a spray grid tray that is of simple construction and can be built economically; and to provide a tray that is suitable for use either with downcomers (wherein a major part of the liquid may be made to descend from tray to tray through a downcomer pipe or passage) or without downcomers (wherein the liquid passes through the slots between the bars in countercurrent to the ascending gas).

In summary, according to the invention, the gas and liquid are contacted in a column having a plurality of transverse, vertically spaced spray grid trays defining spray spaces between them and formed of bars of any configuration, e. g., within each tray either straight, concentrically circular, wave-like, zig-zag, etc., the bars within each tray being spaced apart and having cross-sectional shapes such as to provide between them slots that are essentially uniform in width from top to bottom at least for the greater part of the heights of the bars, the trays being arranged so that the slots constitute substantially the only connection for the flow of gas between spray spaces on opposite sides of the tray, whereby the gas is constrained to pass through the slots with a sufficient velocity to retain liquid on the tray and to form a spray. The bars are preferably arranged so that all slots of the same tray offer the same flow resistance to the passage of vapors per unit length of slot, this being usually effected by using bars of like cross-sectional shapes throughout the same tray and mounting them with uniform horizontal intervals, although different trays at various levels in the column may have slots of different widths. The bars may be individual structural pieces that are welded, bolted, or otherwise secured together, or may be integral with one another. The trays extend transversely to cover the full cross-section of the column and are preferably horizontal or substantially so, although inclined trays can in some cases be used, e. g., when the column is provided with downcomers for transferring the bulk of the liquid from tray to tray. The slot widths, the ratio of the aggregate slot area to the cross-sectional area of the column and the vertical extent of the spray chambers all affect the results obtained and these will be specified in the following detailed description. The column is provided with suitable inlet and outlet connections communicating with the inside of the column at various levels depending upon the specific use to which it is to be put; for example, it may have a gas outlet at the top, a liquid outlet near the bottom, and at least one liquid feed or inlet near the top, or at an intermediate level and, if desired, a second liquid feed or reflux inlet communication means near the top.

According to the method of this invention, liquid descends from tray to tray, either by flow through the slots in the trays or by passage through downcomers, and gas ascends through the column, flowing from spray zone to spray zone through the slots and being confined in the slots to flow as a series of stratiform currents, each current having a substantially uniform thickness throughout at least the major part of the passage through a slot which major part includes the outlet part of the slot. It was found that, by confining the gas flow in this manner, and by regulating the rates of liquid and gas flow as described more fully hereinafter, the dense spray of liquid that is thrown up by the gas into the next higher spray zone results in a very effective contact between gas and liquid, leading to improved contacting efficiencies. It was further found that such a method can be used over a broader range of flow rates than with other slot shapes.

Having described the purpose and nature of the invention in a general manner, the invention will now be described in greater detail with reference to the accompanying drawings forming a part of this specification which show certain illustrative embodiments, wherein:

Fig. 8 is a plan view of a modified form of a spray grid tray using angles instead of rectangular bars;

Figs. 9 and 10 are vertical sectional views of the tray of Fig. 8, taken on lines 9—9 and 10—10 of Figs. 8 and 9, respectively;

Fig. 11 is a fragmentary vertical sectional view of a further modified form of tray; and Fig. 12 is a fragmentary vertical sectional view of a spray grid tray column employing downcomers.

Figure 1:
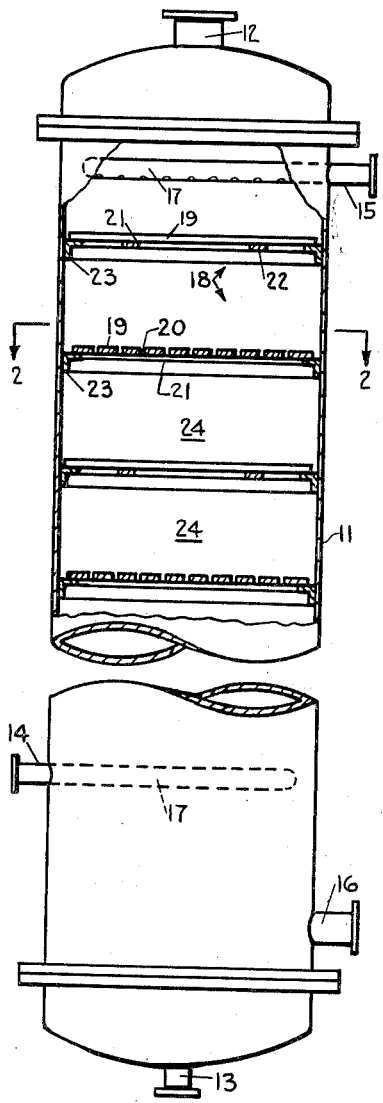
Fig. 1 is an elevation view, partly in section, of a preferred embodiment of the apparatus suitable for use as a fractional distillation column, the grid bars being shown larger than to scale.
Figure 2:
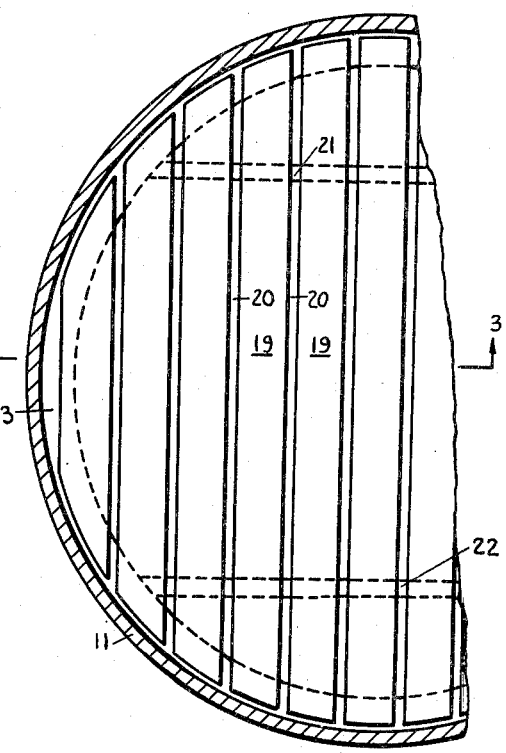
Fig. 2 is a fragmentary enlarged horizontal section taken on line 2—2 of Fig. 1.
Figure 3:
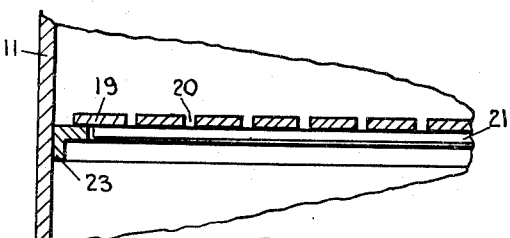
Fig. 3 is a vertical section taken on line 3—3 of Fig. 2.

Referring to the drawings in detail, and particularly to Figs. 1–3, the apparatus comprises a vertical column 11 provided with an overhead gas outlet 12, with a bottom liquid outlet 13, a liquid feed inlet 14 at an intermediate level, a second liquid inlet 15 near the top which may serve to feed reflux or another liquid to the column and a gas inlet 16 near the bottom. The liquid inlets may be provided with suitable distributors, such as perforated rings 17. It is understood that the column is provided with valves for controlling the flow of fluids into and from the column, and may have internal or external reboilers and condensers, etc., not shown, which are well known in the art.

A plurality of spray grid trays 18 are arranged horizontally and extend fully across the column; when the inlet 14 is used to feed liquid to an intermediate level these trays are provided both above and below this inlet. Each tray is formed of a plurality of straight, parallel bars 19, spaced apart with uniform intervals to provide slots 20 having parallel plane surfaces, whereby the slots are of constant cross-section from top to bottom. The bar widths and slot widths are preferably substantially uniform throughout the tray, so as to distribute the slots uniformly and to assure equal flow of vapor and of liquid throughout different parts of the tray. The width of each slot is preferably of the order of about 0.05 to 1.0 inch, best results having been obtained with slot widths of about 0.1 to 0.6 inch. The depth of the slot, i. e., the vertical extent of the bars, is preferably between about one fourth and eight times the slot width. The widths of the bars are selected in relation to the slot widths so that the aggregate area of the slots throughout the tray (herein referred to as free area) is preferably from about 7 to 25% of the area of the grid (which equals the cross-section area of the column when there are no downcomers), best results being obtained within the range 10 to 20%. Thus, bars with maximum widths of about 0.2 to about 3.0 inches are generally employed, and bars from 0.4 to 2.0 inches in width are preferred. For example, according to a preferred design, bars three-quaters of an inch wide and one quarter of an inch thick, are spaced apart to provide slots one quarter inch wide, resulting in a ratio of free area to grid area of about 0.185 (taking into account the obstruction by the supporting structure).

The trays may be secured in the column in any convenient manner. In the embodiment illustrated the bars of each tray are welded to spacer bars 21, 22 and are supported at their ends by a ring 23 which is fixed to the column wall. Successive trays may be any desired relative orientation; however, it is advantageous to dispose each tray with the bars thereof perpendicular to the bars of the adjacent trays, as indicated in Fig. 1, so as to attain better distribution of liquid. The trays are spaced apart vertically by substantial distances so as to define intervening spray spaces 24. These spaces should have heights at least three times the bar widths, preferably at least 2.5 inches, and spaces from about four to twenty-four inches in height are typical.

When the column is applied, for example, to contact a gas and a liquid, these are supplied through the inlets 16 and 15, respectively, and the inlet 14 is not needed and may be omitted. The operation will be described first with reference to such an application.

The spray grid trays according to this invention are operated only at flow rates between lower and upper operating limits, which are also referred to as the dispersion point and load point, respectively. The significance of these points may be explained as follows: When only liquid is supplied continuously to the column at the top it flows through the slots 20 of the successive trays and falls onto the trays beneath; liquid drains freely and no appreciable build-up of liquid on the trays occurs with the rates of liquid flow that are used during normal operation. When gas is admitted at the bottom at a moderately low rate in addition to the liquid, at first the gas flows upwardly through the slots 20 as a plurality of stratiform currents of constant thickness at relatively low velocity and does not interfere substantially with the drainage of liquid. As the rate of gas flow is increased a point is reached at which the stratiform currents interfere with the free drainage of liquid and liquid is retained on the bars as a continuous body and as spray and this condition corresponds to the dispersion point. The gas flow rate corresponding to this condition is, of course, dependent upon the slot width, the free area, and the rate at which liquid is supplied. The dispersion point or lower operating limit may, therefore, be defined as the region at which gas and liquid rates are just sufficient to cause an initial, small build-up of liquid on the trays. When the column 11 is provided with a window this point can be identified visually by the onset of spraying and dancing of droplets on and above the tray. The dispersion point is further characterized by a sharp rise in the liquid hold-up on the tray and of the pressure drop through the column as the vapor or liquid rate is increased and can be detected from pressure drop measurements. When the rate of gas flow is further increased beyond the dispersion point an intense atomization of liquid is produced and a heavy spray is formed that rises well above the upper tray surface. The height of the dense spray rises with increasing gas flow rates. When the gas rate is increased still further a point is reached at which the tray becomes inoperative due to flooding; this point is the upper operating limit or load point. It can be recognized visually by a relatively abrupt build-up of the shallow body of liquid on the trays and by an abrupt rise in the pressure drop through the column. When the trays are spaced reasonably close together, as in the contemplated installation, the dense spray exceeds the height of the spray space at the load point, resulting in entrainment of liquid droplets by the gas flowing to the next higher tray. The load point is further marked by a sharp increase in liquid surges across the tray and by unstable operation.

The maximum useful operating range of a spray grid tray consists of the region between the dispersion point and load point, since below the dispersion point only a film of liquid exists on the tray and tray efficiency is consequently very poor, while the column obviously will not operate in a stable manner above the load point. Optimum results are usually obtained when operating within a narrower, intermediate portion of this range, at rates of flow over 130% of the dispersion point and less than 90% of the load point. Between these limits stable operation is achieved and the dense spray thrown up from the slots into the spray space is most effective resulting in efficient contact between the gas and liquid.

When the spray space has a height less than the minimum heretofore specified the dense spray of liquid touches the next higher tray and the load point is reduced sharply, in extreme conditions even approaching the dispersion point; the operating range is then reduced to zero and operation according to the method of this invention then becomes impossible.

It is a particular feature of the spray grid trays according to this invention that they have high contacting efficiencies and that the operating range between the dispersion point and the load point is high.

As was previously indicated, the column can also be used for fractional distillation, vapor being drawn off at the top through the outlet 12 and distillation residue at the bottom through the outlet 13, as in the case previously described. The feed to the column may be at any desired level, such as that of the inlet 14, and ascending vapors may be generated within the column by supplying heat to the column in any conventional manner, such as passing part of withdrawn residue through a reboiler and returning it through the inlet 16, or by providing a heating coil at the bottom; in the latter case the inlet 16 is not needed.

Figure 4:
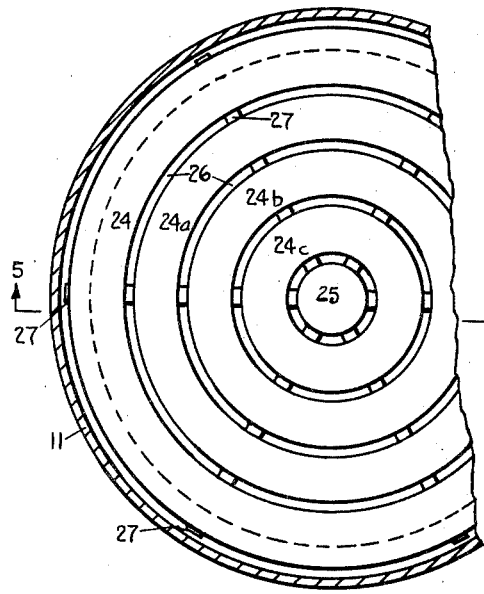
Figs. 4 and 5 are fragmentary plan and vertical sectional views, respectively, of a tray having an alternate configuration of the bars, Fig. 5 being taken on line 5—5 of Fig. 4.
Figure 5:
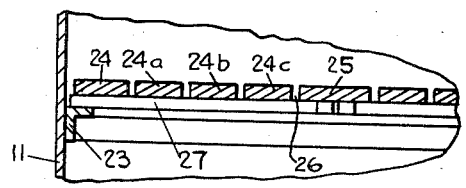

Referring to Figs. 4 and 5, there is illustrated a modified configuration of the grid bars, which are concentric annuli 24, 24a, 24b and 24c, surrounding a circular center piece 25 and spaced apart to provide intervening circular slots 26. The rings and center piece are welded to radial supports 27 carried by an annular ring 23 that is fixed to the wall of the column 11.

Figure 6:
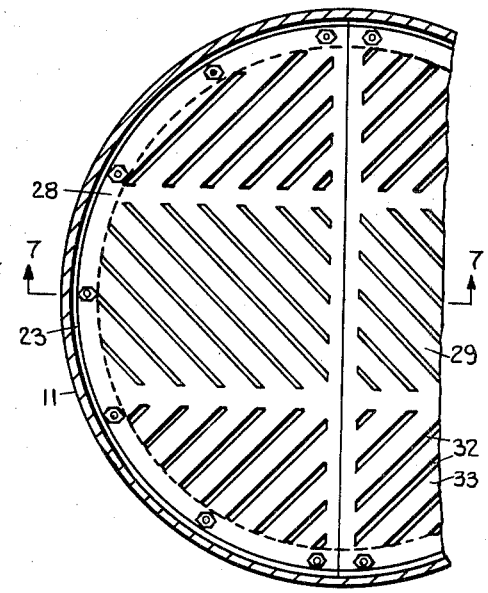
Figs. 6 and 7 are fragmentary plan and sectional views, respectively, of another alternate configuration, Fig. 7 being taken on line 7—7 of Fig. 6.
Figure 7:
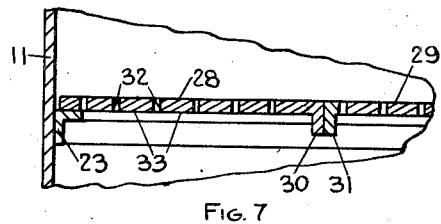

Figs. 6 and 7 illustrate three further modifications, viz., zig-zag bars and slots, integral bars, and sectional trays to permit removal from the column. In this arrangement the column 11 again carries a fixed ring 23 for each tray. The tray is formed of two semi-circular plates 28 and 29 having stiffening flanges 30 and 31, respectively. Each plate has a plurality of perforations or apertures 32 in the form of slots, leaving intervening bars 33.

Referring to Figs. 8–10, there is illustrated a modified construction employing structural angles instead of rectangular bars. Each spray grid tray comprises a plurality of opposed, equal-legged angles 34 and 35, the angles 34 being disposed with their outer apices up and the angles 35 with their outer apices down. The lower sides of these angles are notched at intervals to receive supporting spacer-bars 36 to which they are welded so as to provide parallel-walled slots of constant thickness between adjacent, opposed angles as shown in Fig. 9. The bars 36 rest on a ring 23 secured to the inner wall of the column 11 and carry segment-shaped plates 36a for closing off the margins of the tray. Adjacent trays of this form may be mounted as was indicated in Fig. 1, i. e., with the slots perpendicular to those of adjacent trays. The slot widths in this case are measured perpendicular to the faces of the flat faces of the angles, i. e., inclined 45° to the horizontal, and the free area is similarly determined. The preferred dimensional relations and the operation of this embodiment are similar to those previously described for Figs. 1–3.

Instead of structural angles it is also possible to use solid bars of triangular cross-section as shown in Fig. 11. In this embodiment the bars 37 and 38 have any suitable cross-sections, e. g., equilateral triangles as shown, and are welded to a supporting spacer-bar 39 in opposed relation so that the bars 37 have a flat side resting on the spacer bars and the alternate bars 38 have a flat side uppermost. To facilitate assembly the bars 38 may be notched at their lower edges at intervals to accommodate the spacer bars. The tray is supported by a ring 23 fixed to the column 11.

Fig. 12 illustrates the application of the spray grid trays to a column provided with downcomers. The column 11 has a plurality of vertically spaced trays 40 defining spray spaces 41 between them and comprising parallel bars 42. Each tray may have an overflow weir 43 extending above the tray level a short distance, e. g., a few inches, but these weirs may in certain instances be omitted. A wall 44, shown to be integral with the weir, extends downward close to the level of the next lower tray and is sealed to the column wall to form therewith a confined conduit or downcomer. Each tray has an imperforate portion 45 beneath the downcomer from the tray above, the edge of which is bent up to provide a distributing baffle 46 for insuring distribution of liquid along the lengths of the bars and to prevent vapor flow into the downcomer. With this arrangement the amount of liquid that flows through the downcomers is determined by the height of the weirs 43, the free area of the tray and the rates of liquid and gas flow. With moderately low liquid flows and a high weir this column operates much as the previously described embodiments and most of the liquid flows down through the slots; the downcomers in this case serve to accommodate temporary column overloads, thereby permitting continued stable operation. When lower free areas are used, e. g., from 7 to 12% of the column cross-section, a minor amount of liquid only flows downwardly through the slots between the bars 42 when the vapor flow rate is above the dispersion point, most of it passing downwardly through the downcomers and flowing across the tray. While the grid bars are preferably arranged transversely to the direction of liquid flow across the tray, as shown in Fig. 12, other orientations of the grid bars may also be employed.

The arrangement according to Fig. 12 finds especial application in instances where high ratios of liquid to vapor flow rates are encountered.

The results attainable with the spray grid trays of this invention are indicated by the following experimental results: A column constructed in accordance with Figs. 1 and 2, but having a rectangular cross-section, had the following dimensions:

| | | |
|---|---|---|
| Column cross-section area | square feet | 9 |
| Tray spacing | inches | 18 |
| Bar width | do | 0.75 |
| Bar thickness | do | 0.25 |
| Slot width | do | 0.25 |
| Ratio free area to column area | | 0.185 |

To test contacting efficiencies, water containing very dilute concentrations of acetone in solution was fed into the column at the top at a temperature of 70° F. and a rate of 100 gallons per minute (11.1 gal./min./sq. ft. of col. cross-section), while air at the same temperature and a pressure of 0.1–0.2 p. s. i. g. was fed at the bottom at various flow rates. The contacting efficiencies were calculated from the acetone concentrations in the feed water and the water withdrawn from column and known activity coefficients, and are given in Table I. Plate efficiencies based on liquid concentration changes are given as percentages of the degree of contacting that would be attained in a theoretically perfect stage:

TABLE I

| Air Rate, Standard cu. ft./min. | Tray Efficiency Based on Liquid Concentration Change, Percent |
|---|---|
| 1,400 | 23.0 |
| 2,500 | 34.5 |
| 3,500 | 45.7 |
| 3,870 | [1] (48) |

[1] Load point.

The efficiency at the load point is uncertain. The data show that the efficiency is high at 90% of the load point (at a gas flow rate of 3500).

The wide operating ranges attainable are illustrated by the following data. Two columns were tested to determine the dispersion and load points; the first column was constructed as described above, and the second column was constructed in accordance with Figs. 8–10 and had the same column shape and area, tray spacing and ratio of free area to column cross-section area, but used opposed angles 0.71 in. wide (measured horizontally), spaced to produce slots 0.176 in. in width. Each column was tested with water and air under the conditions given above at two different rates of liquid flow. The operating ranges given in Table II are the ratios of the air flow rate at the load point to the air flow rate at the dispersion point:

TABLE II

| Water Flow Rate, Gal./min./sq. ft., of col. cross-section | Operating Range | |
|---|---|---|
| | Column 1 (Rectangular Bars) | Column 2 (Opposed Angles) |
| 2.78 | 5.5 | 6.4 |
| 11.1 | 7.4 | 7.3 |

It should be noted that the several features combined for purposes of illustration in the different views of the drawings may be individlally substituted for one another.

The term gas, as used in this specification, includes vapor.

It should be noted that in all embodiments the grid forms a bed for supporting the body of liquid built up thereon at a level above the upper termini of the slots, whereby substantially all liquid in said body would drain from the tray in the absence of upward gas flow. The recesses in the upper parts of the grid bars 35 according to Figs. 8–10 retain only insignificant amounts of liquid that is continually mixed with the accumulated body of liquid above the level at which the gas emerges from the slots, whereby intimate contact of all liquid with gas is brought about.

The subject matter of Figure 12 is claimed in copending application Serial No. 200,428, filed December 12, 1950, and now abandoned.

We claim as our invention:

1. A spray grid tray contacting column for effecting intimate contact between an ascending gas and a descending liquid by forming a dense, upwardly directed spray of liquid by the action of said gas at a succession of levels in the column, the combination of: an upright tower; within said tower, a plurality of transverse spray grid trays each comprising a plurality of closely spaced grid members, said trays being spaced apart vertically by distances at least three times the widths of said grid members to provide a plurality of intervening spray spaces of appreciable heights for the retention of a body of liquid on each tray and the passage of a dense spray of said body of liquid upwardly within the spray spaces and the passage of gas through the spray space above said body of liquid and beneath the supervening tray, the said grid members having such cross-sectional shapes and being so spaced as to form between them narrow slots that have constant widths throughout the major parts of the depths of the grid members including substantially the upper parts thereof, said slots having widths of about 0.25 inch and depths of about 0.25 inch, said grid members being spaced so that said narrow slots constitute the only connection for the passage of gas between spray spaces below and above each respective tray; and means for supplying liquid to an upper part of the tower and gas to a lower part of the tower at rates sufficient to effect the said retention of a body of liquid distributed on each tray and the said formation of a dense spray.

2. The column according to claim 1 wherein said slots constitute the only connection for the downward flow of liquid from tray to tray, whereby all the liquid descends through said slots in countercurrent to the ascending gas.

3. The column according to claim 1 wherein the said grid members of the trays are rectangular in cross-section and are mounted with their sides vertical.

4. The column according to claim 1 wherein the said grid members of the trays have side faces which are inclined to each other and are mounted with the said side faces of adjacent grid members parallel to one another.

5. The column according to claim 4 wherein the said grid members are structural angles mounted with the leg surfaces of the angles inclined to the vertical, alternate structural angles having their apex angles on the top and the intervening structural angles having their apex angles at the bottom, said leg surfaces of each structural angle being parallel to the leg surfaces of adjacent structural angles.

References Cited in the file of this patent

UNITED STATES PATENTS

| 1,690,092 | Stocker | Oct. 30, 1928 |
| 1,790,489 | Sippel et al. | Jan. 27, 1931 |
| 1,826,912 | Weston | Oct. 13, 1931 |
| 1,986,736 | Mauthe et al. | Jan. 1, 1935 |
| 2,560,978 | Persson et al. | July 17, 1951 |
| 2,564,078 | Pyle | Aug. 14, 1951 |

FOREIGN PATENTS

| 489,452 | France | Oct. 1, 1918 |
| 505,114 | Germany | Aug. 14, 1930 |
| 618,029 | Great Britain | Feb. 15, 1949 |
| 885,548 | France | May 31, 1943 |